US009191232B2

(12) United States Patent
Braithwaite et al.

(10) Patent No.: US 9,191,232 B2
(45) Date of Patent: *Nov. 17, 2015

(54) INTELLIGENT NETWORK COMMUNICATION DEVICE IN AN AUDIO VIDEO DISTRIBUTION SYSTEM

(75) Inventors: Michael Braithwaite, Austin, TX (US); Herman Cardenas, Georgetown, TX (US)

(73) Assignee: NETSTREAMS, LLC, Austin, TX (US)

( * ) Notice: Subject to any disclaimer, the term of this patent is extended or adjusted under 35 U.S.C. 154(b) by 676 days.

This patent is subject to a terminal disclaimer.

(21) Appl. No.: 12/900,666

(22) Filed: Oct. 8, 2010

(65) Prior Publication Data
US 2011/0026727 A1 Feb. 3, 2011

Related U.S. Application Data

(63) Continuation of application No. PCT/US03/14603, filed on May 8, 2003, and a continuation of application No. 10/513,737, filed on Nov. 4, 2004, now Pat. No. 7,643,894, and a continuation of application No.
(Continued)

(51) Int. Cl.
H04L 12/28 (2006.01)
(52) U.S. Cl.
CPC ..... H04L 12/2823 (2013.01); *H04L 2012/2841* (2013.01)
(58) Field of Classification Search
CPC ............... G11B 20/10507; G11B 2020/10546; G11B 2020/10555; G11B 2020/10564; G11B 2020/10576; G11B 2020/10601; H04L 12/2823; H04L 2012/2841
USPC ............ 700/94; 381/77.88–77.82, 85, 55, 57, 381/59
See application file for complete search history.

(56) References Cited

U.S. PATENT DOCUMENTS 4,525,746 A 6/1985 Mangold
4,888,811 A * 12/1989 Takashi ........................ 381/99
(Continued)

FOREIGN PATENT DOCUMENTS

AU 2003241405 A1 1/2004
AU 2003241405 B2 6/2008
(Continued)

OTHER PUBLICATIONS

Office action response filed for Australian Patent Application No. 2008207498, filed on Apr. 13, 2011, 29 pages.
(Continued)

*Primary Examiner* — Ping Lee
(74) *Attorney, Agent, or Firm* — Matthew J. Booth & Associates PLLC; Matthew J. Booth

(57) ABSTRACT

This disclosure describes an intelligent network communication device in an audio video distribution system that uses a local area network that includes a network speaker node; an audio input device that receives the analog audio signal and that couples to a network speaker node through a speaker/microphone driver; and an audio output device that transmits the analog audio signal and that couples to the network speaker node through the speaker/microphone driver. The network speaker node further includes a controller with a network interface that couples to the local area network, where the controller further comprises an embedded controller with memory and which is programmed to function as a web server. The network speaker node further includes a digital signal processor that couples to the controller. And, the network speaker node further includes a speaker/microphone driver that couples to the digital signal processor.

15 Claims, 9 Drawing Sheets

Related U.S. Application Data

11/467,340, filed on Aug. 25, 2006, now Pat. No. 8,131,390.

(60) Provisional application No. 60/379,313, filed on May 9, 2002.

(56) References Cited

U.S. PATENT DOCUMENTS

| | | |
|---|---|---|
| 5,402,499 A | 3/1995 | Robison et al. |
| 5,406,634 A | 4/1995 | Anderson et al. |
| 5,519,641 A | 5/1996 | Beers et al. |
| 5,544,228 A | 8/1996 | Wagner et al. |
| 5,588,065 A | 12/1996 | Tanaka et al. |
| 5,722,041 A | 2/1998 | Freadman |
| 5,729,611 A | 3/1998 | Bonneville |
| 5,742,690 A | 4/1998 | Edgar |
| 5,799,042 A | 8/1998 | Xiao |
| 5,822,440 A | 10/1998 | Oltman et al. |
| 5,832,024 A | 11/1998 | Schotz et al. |
| 5,903,135 A | 5/1999 | Posses et al. |
| 5,946,343 A | 8/1999 | Schotz et al. |
| 6,064,699 A | 5/2000 | Law |
| 6,085,236 A | 7/2000 | Lea |
| 6,101,180 A | 8/2000 | Donahue |
| 6,108,625 A | 8/2000 | Kim |
| 6,122,382 A | 9/2000 | Lida et al. |
| 6,185,305 B1 | 2/2001 | Reinold et al. |
| 6,263,503 B1 | 7/2001 | Margulis |
| 6,315,666 B1 | 11/2001 | Mastera |
| 6,327,477 B1 | 12/2001 | Hachimura et al. |
| 6,327,563 B1 | 12/2001 | Takagi |
| 6,329,908 B1 | 12/2001 | Frecska |
| 6,378,010 B1 | 4/2002 | Burks |
| 6,574,234 B1 | 6/2003 | Myer et al. |
| 6,934,300 B2 | 8/2005 | Tomassetti et al. |
| 7,050,971 B1 * | 5/2006 | Kaufholz ............ 704/226 |
| 7,181,299 B2 | 2/2007 | Osakabe et al. |
| 7,200,644 B1 | 4/2007 | Flanagan |
| 8,131,389 B1 | 3/2012 | Hardwick et al. |
| 8,131,390 B2 | 3/2012 | Braithwaite |
| 8,725,277 B2 | 5/2014 | Braithwaite et al. |
| 2001/0005174 A1 | 6/2001 | Olson et al. |
| 2002/0026541 A1 | 2/2002 | Suzuki et al. |
| 2002/0059425 A1 | 5/2002 | Belfiore et al. |
| 2002/0065568 A1 | 5/2002 | Silfvast et al. |
| 2002/0072816 A1 | 6/2002 | Shdema et al. |
| 2002/0072817 A1 | 6/2002 | Champion |
| 2002/0075965 A1 | 6/2002 | Claesson et al. |
| 2002/0077114 A1 | 6/2002 | Isham |
| 2002/0082730 A1 | 6/2002 | Capps et al. |
| 2002/0087224 A1 | 7/2002 | Barile |
| 2002/0186662 A1 | 12/2002 | Tomassetti et al. |
| 2002/0188752 A1 | 12/2002 | Tomassetti et al. |
| 2002/0188762 A1 | 12/2002 | Tomassetti et al. |
| 2003/0014486 A1 | 1/2003 | May |
| 2003/0023741 A1 | 1/2003 | Tomassetti et al. |
| 2003/0028584 A1 | 2/2003 | Coniglio et al. |
| 2005/0076134 A1 | 4/2005 | Bialik et al. |
| 2005/0131558 A1 | 6/2005 | Braithwaite et al. |
| 2006/0287746 A1 | 12/2006 | Braithwaite et al. |
| 2008/0109095 A1 | 5/2008 | Braithwaite et al. |
| 2008/0114481 A1 | 5/2008 | Braithwaite et al. |
| 2009/0193472 A1 | 7/2009 | Braithwaite et al. |
| 2010/0172512 A1 | 7/2010 | Braithwaite et al. |
| 2010/0303046 A1 | 12/2010 | Braithwaite et al. |
| 2011/0044468 A1 | 2/2011 | Braithwaite et al. |
| 2011/0044469 A1 | 2/2011 | Braithwaite et al. |
| 2011/0185389 A1 | 7/2011 | Braithwaite et al. |

FOREIGN PATENT DOCUMENTS

| | | |
|---|---|---|
| AU | 2008207498 A1 | 9/2008 |
| AU | 2008207498 B2 | 9/2008 |
| AU | 2011211407 A1 | 11/2012 |
| AU | 2011211407 B2 | 11/2012 |
| CA | 2485104 A1 | 11/2003 |
| EP | 1098548 A2 | 5/2001 |
| EP | 1146775 A2 | 10/2001 |
| EP | 1504367 A2 | 2/2005 |
| GB | 2199466 A | 7/1988 |
| KR | 10-2005-0005472 A1 | 1/2005 |
| WO | 02091596 A2 | 11/2002 |
| WO | 03/096741 A2 | 11/2003 |
| WO | 03096741 A3 | 4/2004 |

OTHER PUBLICATIONS

Notice of Acceptance Received for Australian Patent Application No. 2008207498, mailed on May 12, 2011, 2 pages.

Office Action received for European Patent Application Serial No. 03731139.6, mailed on Jun. 25, 2010, 6 Pages.

Examiner's First Report received for AU Application No. 2008207498, mailed on Apr. 13, 2010, 2 Pages.

Office Action received for Korean Patent Application No. 10-2004-7017970, mailed on Oct. 8, 2009, 5 pgs.

Office Action received for Australian Patent Application No. 2003-241405, mailed on Mar. 27, 2008, 2 pgs.

Office Action received for Australian Patent Application No. 2011-211407, mailed on May 21, 2012, 1 pg.

Response to Office Action filed for Australian Patent Application No. 2003241405, filed on May 15, 2008, 34 pgs.

International Preliminary Examination Report received for International Patent Application No. PCT/US2003/014603, completed Sep. 21, 2004, 4 pgs.

* cited by examiner

INTELLIGENT NETWORK COMMUNICATION DEVICE IN AN AUDIO VIDEO DISTRIBUTION SYSTEM

CROSS REFERENCE TO RELATED APPLICATIONS

This application claims the benefits of the earlier filed U.S. Provisional Application Ser. No. 60/379,313, filed 9 May 2002, which is incorporated by reference for all purposes into this specification.

Additionally, this application is a continuation of International Patent Application PCT/US2003/014603, filed 8 May 2003, which is incorporated by reference for all purposes into this specification.

Additionally, this application is a continuation of U.S. patent application Ser. No. 10/513,737, filed 4 Nov. 2004, which is incorporated by reference for all purposes into this specification.

Additionally, this application is a continuation of U.S. patent application Ser. No. 11/467,340, filed 25 Aug. 2006, which is incorporated by reference for all purposes into this specification.

BACKGROUND OF THE INVENTION

1. Field of the Invention

The present invention relates to audio video distribution systems. More specifically, the present invention relates to intelligent network communication devices in an audio video distribution system.

2. Description of the Related Art

Currently, most audio speakers are passive devices that receive an analog or digital audio signal. A few advanced models have limited self-diagnostics that can be communicated out over additional wire runs as well. These speakers are usually wired to racks or source switching pre-amps and amplifiers. The problem with this approach is that these systems are not very flexible. It is hard to expand the audio sources that can be heard through the speakers embedded in walls or other places after the system has been installed without buying and installing additional costly components. Other audio sources include as home control system voice communication, intercom audio, soundtracks for CD-ROM games, solid-state sound memories. Digital audio broadcasting systems, and even Internet audio can not easily be added and routed through to the existing speakers at a future date if the existing system was not originally designed to input and handle it. This is mostly due to the ongoing proliferation of new audio compression formats. High-quality digital audio data takes a lot of hard disk space to store (or channel bandwidth to transmit). Because of this many companies have worked on compressing and or coding of the bit stream to allow for a smaller binary footprint. This allows for high quality music to take up less storage space and to be transported across vast networks with a smaller amount of data, and therefore less bandwidth. However, these new compression and encoding formats require that un-compression and decoding be performed to reconstitute the original audio before it is played out the loudspeaker. If an existing audio system is limited to reconstituting only audio formats known at the time of installation, the audio system quickly becomes obsolete.

Many new products have wireless network capabilities, but still cannot be easily connected into a home network, because of a lack of easily accessible wireless to wired network bridging within range of the device. This can especially be a problem if the wireless device is a handheld mobile unit such as a PDA, and due to a lack of access points, cannot communicate from all rooms in the house.

The current approach to controlling audio and doing home automation is often cumbersome. The sound system remote that allows the room audio level to be adjusted does not allow the room lights to be dimmed. Therefore, different remote controllers for each function are needed. Nor do users like the "wall clutter" created by putting separate multiple audio and other home network control units in the walls. Wireless solutions to this problem such as Radio Frequency, known as RF, or Infra-Red, called IR, have limitations. The biggest limitation for RF is that in many large cites, the RF noise background is very high, creating communication problems, and there may be health concerns with excessive RF. The IR limitation is that IR is effective in "line of sight" only, and the home automation devices to be controlled may be in other rooms. These problems are compounded in retrofit situations where die minimal changes that affect the current building and existing systems are desired.

It is therefore the object of this invention to provide a networked speaker, so that an audio distribution system can be created that is integrated with the home automation system into a home network that permits vocal feedback, status, and even control with the audio through the network speakers. The network should let the user know what is happening, and provide very intuitive instruction on how to use the system. This will enable the audio speakers to easily adjust to and allow new audio sources and to become wireless access points in the home, or provide the wireless bridge to the hard-wired network.

SUMMARY OF THE INVENTION

This disclosure describes an intelligent network communication device in an audio video distribution system that uses a local area network. The intelligent network communication device includes a network speaker node; an audio input device that receives the analog audio signal and that couples to a network speaker node through a speaker/microphone driver; and an audio output device that transmits the analog audio signal and that couples to the network speaker node through the speaker/microphone driver. The network speaker node further includes a controller with a network interface that couples to the local area network and controls the processing of the digital audio signal, where the controller further comprises an embedded controller with memory and which is programmed to function as a web server. The network speaker node further includes a digital signal processor that couples to the controller, where the digital signal processor processes and formats the digital audio signal and the analog audio signal and converts the digital audio signal to and from the analog audio signal. And, the network speaker node further includes a speaker/microphone driver that couples to the digital signal processor and provides the external connection for the analog audio signal.

The intelligent network communication device further provides that the audio input device is a microphone. In addition, the intelligent network communication device further provides that the audio output device may include headphones or include one or more speakers.

Additionally, the intelligent network communication device further includes speaker sensors that couple to the digital signal processor and provide feedback and allow for sending control signals back to other devices in the local area network.

DESCRIPTION OF THE DRAWINGS

To further aid in understanding the invention, the attached drawings help illustrate specific features of the invention and the following is a brief description of the attached drawings.

DETAILED DESCRIPTION OF THE INVENTION

Figure 1:
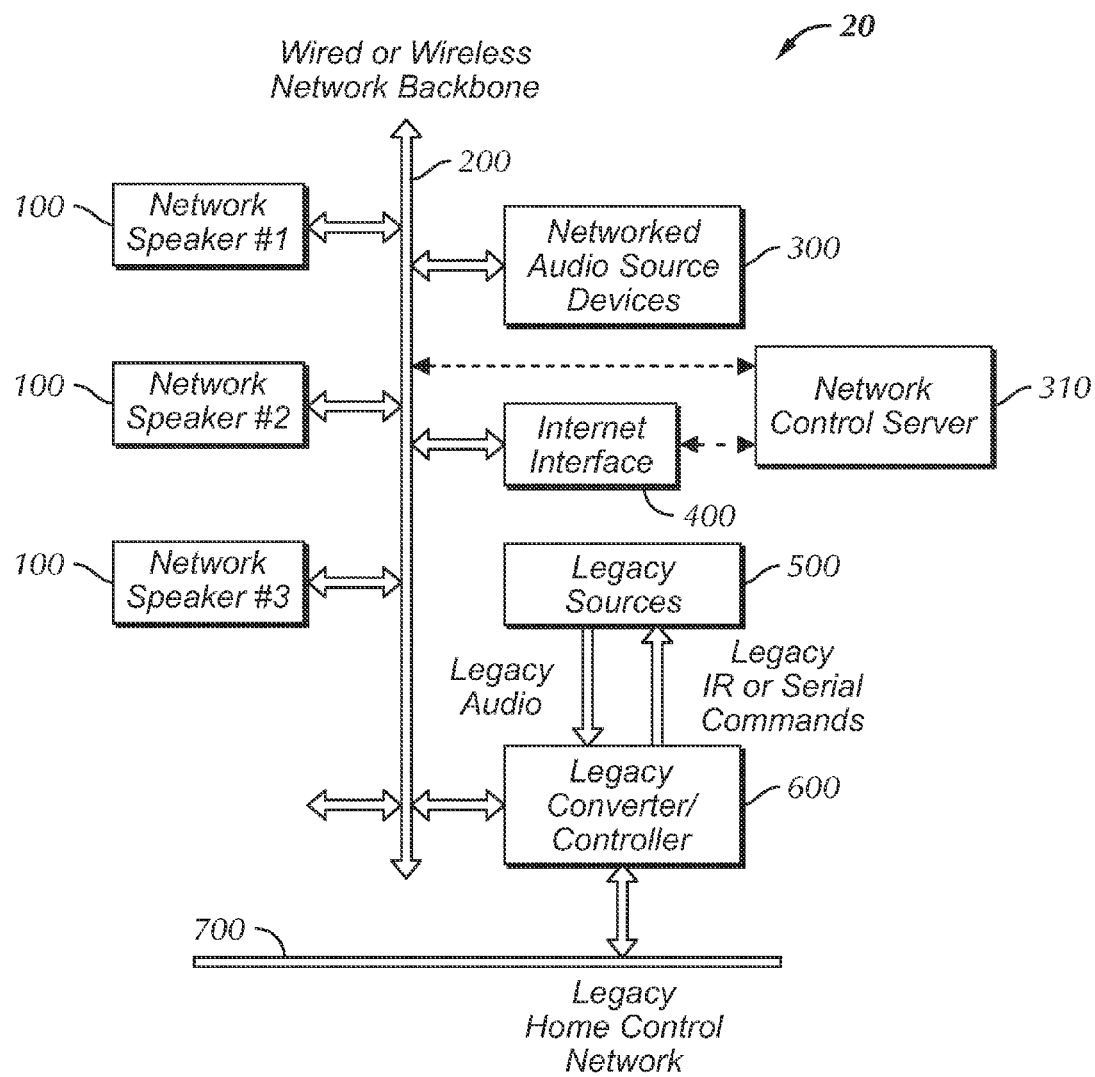
FIG. 1 is a block diagram of an audio distribution system.

An audio distribution network system 20 (FIG. 1) includes a plurality of speaker node units 100 which are coupled to a Transport Control Protocol/Internet Protocol (TCP/IP) based network backbone 200. Also coupled to the network backbone 200 are networked audio source node devices 300, an Internet service interface 400, and a Legacy converter/controller 600. Legacy sources 500 provide analog or digital linear PCM (Pulse Coded Modulation) audio to be converted into a packet switched digital coding for transport across the network. They will also provide analog video which will be used for control status feedback, as well as conversion to a packet switched digital coding for transport across the network. In addition, the Legacy sources 500 will also receive IR or serial commands from the converter/controller 600 which also communicates with a Legacy home control network 700. Some legacy sources 500 may also provide serial communications to the converter/controller 600.

The networked audio source devices 300 can consist of any number of networked digital audio source devices (music playback devices) such as personal computers or audio servers that are able to communicate with one another over the shared TCP/IP network 200 and have the resources to serve digital audio files (WMA, MP3, Corona, etc.) to the network. Bit streamed audio (digital music, in the form of binary data that is sent in packets) from the Internet also may enter the system 20 from the Internet interface 400. The Legacy audio devices 500 (existing analog audio equipment, i.e. CD players, tape decks, VCR's) have their audio converted into a packet switched digital network format (WMA, MP3, Corona) by the Legacy Converter 600 or by the network speakers 100. The network speaker 100 can also real time encode sound received from its internal microphone or from reversing the transduction circuit from the speaker to perform the act of capturing sound waves present in the room, and then coding that sound and providing it for use on the network 20, including by use of differential masking for control purposes. Any new device that is able to send audio out on the network can serve as the audio source for a network speaker 100 as long as the network speaker 100 understands the audio format. Control commands that affect the audio distribution can come from the network control server 310, network audio source devices 300, the Internet interface 400, the legacy home control network 700 via the legacy converter/controller 600, or from other network speakers 100.

The system 20 is a collection of independent computers or other intelligent devices that communicate with one another over the shared TCP/IP network 200. For example, the system 20 can be part of the Internet linked networks that are worldwide in scope and facilitate data communication services such as remote login, file transfer, electronic mail, the World Wide Web and newsgroups, or for security reasons part of a home intranet network utilizing Internet-type tools, but available only within that home. The home intranet is usually connected to the Internet via an Internet interface 400. Intranets are often referred to as LANs (Local Area Networks).

The home network backbone 200 communicates using the TCP/IP network protocol consisting of standards that allow network members to communicate. A protocol defines how computers and other intelligent devices will identify one another on a network, the form that the data should take in transit, and how this information is processed once it reaches its final destination. Protocols also define procedures for handling lost or damaged transmissions or "packets". The TCP/IP network protocol is made up of layers of protocols, each building on the protocol layers below it. The basic layer is the physical layer protocol that defines how the data is physically sent through the physical communication medium, such as Thickwire, thin coax, unshielded twisted pair, fiber optic, telephone cable, fiber optic cable, RF, IR, power line wires, etc. Those physical media requiring an actual physical connection of some type, such as Thickwire, thin coax, unshielded twisted pair, fiber optic, power line, telephone cable, or fiber optic cable, to the network device are called wired media Those physical media not requiring an actual physical wire connection of any type to the network device, such as RF and IR, are called wireless media. A TCP/IP home network can be totally wired, totally wireless, or a mix of wireless and wired. A TCP/IP home network is not limited to a single physical communication medium. Different physical communication media can be connected together by bridging components to create a unified communication network. Each network physical media has its physical layer protocol that defines the form that the data should take in transit on that particular physical media. The bridging component enables the transfer and conversion of communication on one physical medium and its physical layer protocol to a different physical media and its physical layer protocol. Bridging components also may provide a proxy from one network to the other, this will be common among UpnP V1 to V2, and with Ipv6 to Ipv4 (Internet Protocol version 6, 4). Common physical layer LAN technology in use today include Ethernet, Token Ring, Fast Ethernet, Fiber Distributed Data Interface (FDDI), Asynchronous Transfer Mode (ATM) and LocalTalk. Physical layer protocols that are very similar over slightly different physical media are sometimes referred to be the same name but of different type. An example are the three common types of Fast Ethernet: 100 BASE-TX for use with level 5 UTP cable, 100BASE-FX for use with fiber-optic cable, and 100BASE-T4 which utilizes an extra two wires for use with level 3 UTP cable. The TCP/IP protocol layers are well known and will not be further described in greater detail.

The system 20 may have any number of networked self-sufficient digital audio source devices 300 in it, such as a digital music storage device, PC, music player, personal Digital Assistant (PDA), on board automobile music system, digital integrated audio equipment, personal digital recorder or video digital recorder. Networked audio source devices 300 can provide digital audio files such as WMA, MP3, "Corona", and MLP from its hard disk, internal flash, or an audio input such as a microphone or CD reader or music player. The system 20 may also have any number of network control servers 310 that can encompass a specialized network server, usually a specialized, network-based hardware device designed to perform a single or specialized set of server functions. It is usually characterized by a minimal operating architecture, and client access that is independent of any operating system or proprietary protocol. Print servers, terminal servers, audio servers, control remote access servers and network time servers are examples of server devices which are specialized for particular functions. Often these types of servers have unique configuration attributes in hardware or software that help them to perform best in their particular arena. While specialized hardware devices are often used to perform these functions in large systems, the specialized functions served by the network server could be performed by a more general use computer. A single computer, (sometimes referred to as a RISC (reduction instruction set computer), called a web server, could combine the functionality of the networked audio source devices 300 and the Internet interface 400. If no connection to the Internet is desired, the Internet interface 400 function can be removed from the system without loss of intranet network integrity. Network and web servers are well known and will not be described in greater detail.

The legacy home control network 700 is an existing network of devices in the home used to automate and control the home. If the legacy home control network 700 can not communicate over a shared TCP/IP network 200, it cannot directly control or be controlled by the network speakers, and the two dissimilar networks must be bridged by a Legacy Converter/Controller 600. Any legacy home control network 700 that can communicate within the system 20 over a shared TCP/IP network could be combined into the home network backbone 200 and then the legacy home control network 700 device would have access to and be able to control the network speaker 100 if it has the resources and instructions to do so. The Legacy Converter/Controller 600 can also be used to provide network access to un-networked legacy devices that are able to serve as command and control interfaces such as the telephone, cell phone, RF remote, IR remote, direct voice controller or keypad. A networked audio source 300 such as a PDA, also can act as the legacy converter/controller for a legacy device such as an attached cell phone.

The legacy home audio sources 500 are other audio sources that are not able to communicate over a shared TCP/IP network 200, such as analog audio players, CD players, video game players, tape players, telephone, VCRs or other audio sources that are not able to communicate over a shared TCP/IP network 200. The legacy Converter/Controller 600 takes the analog or digital linear PCM audio from the Legacy home sources 500, converts it into an acceptable digital format or formats if needed, and serves the audio as needed over the shared TCP/IP home network backbone 200. If the legacy home audio source 500 provides an analog audio to the Legacy Converter/Controller 600, the Legacy Converter/Controller 600 must convert the analog audio into an appropriate digital audio format before serving it to the network. The Legacy Converter/Controller 600 can also convert commands sent from the home network 200 to the legacy home source 500 into a command format that is understood by the legacy home source 500, such as serial, RF or IR commands. A system may have multiple Legacy Converter/Controllers 600 for each legacy home source 500 or legacy home control network 700, or a Legacy Converter/Controller 600 may convert and control more than one legacy home source 500 or multiple Legacy home control networks 700.

Figure 2:
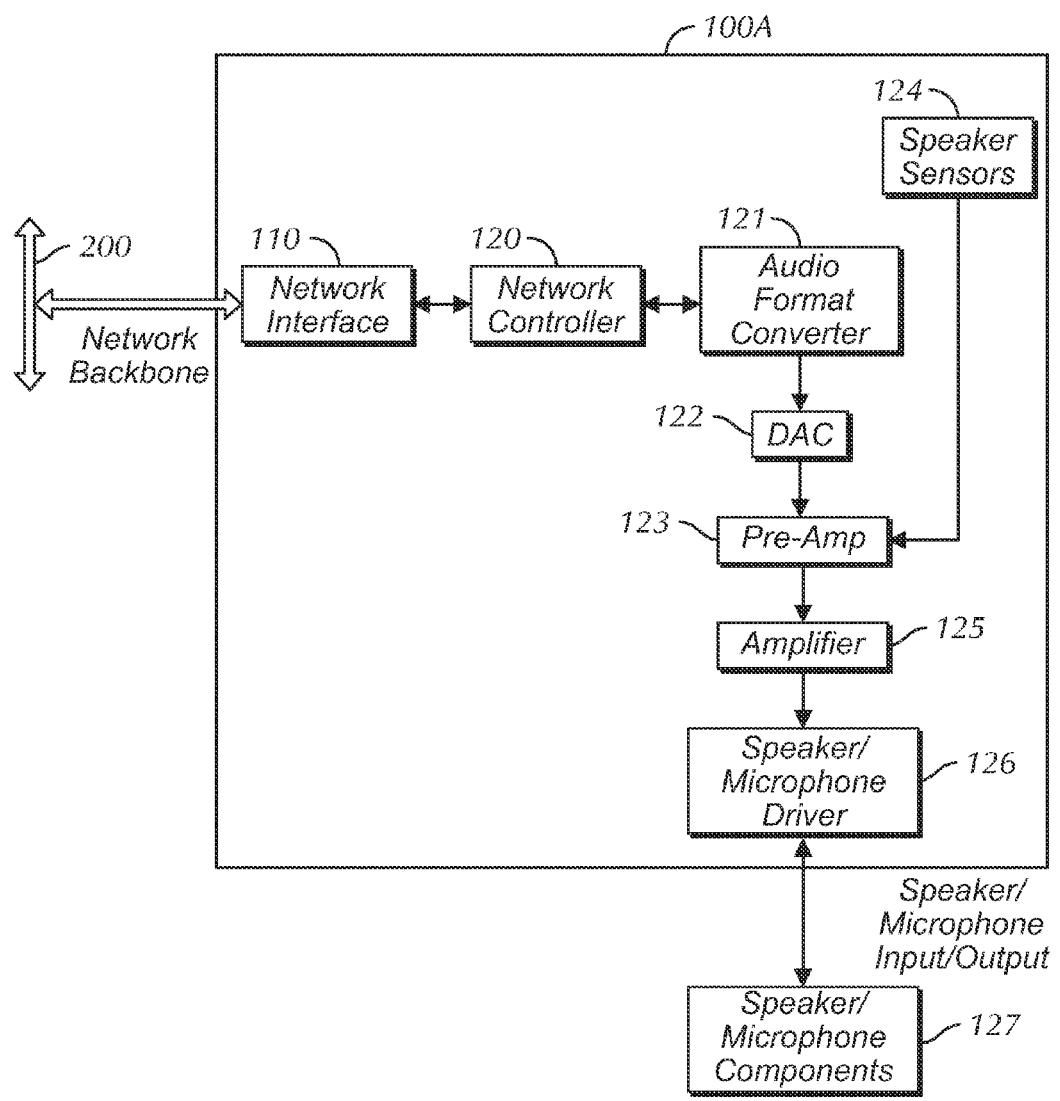
FIG. 2 is a block diagram of a network speaker embodiment of the system shown in FIG. 1.

Illustrated in FIG. 2 is one network speaker embodiment 100A. A network interface 110 couples the network backbone 200 of the system 20 (FIG. 1) to a network controller 120 which feeds a digital to analog converter (DAC) 122 via an audio format converter 121. Receiving an output from the DAC 122 is a pre-amplifier 123 which also receives inputs from speaker sensors 124. An amplifier 125 receives the output of the pre-amp 123 and feeds a speaker/microphone driver 126 coupled to speaker/microphone components 127.

The network speakers 100A may be enclosed in a case or box, in a ceiling embedded in or behind a wall, or in a car and constitute the most prevalent enabling components in the system 20. Each network speaker 100A communicates to the network backbone (Ethernet) 200 through the network interface 110 that handles the physical layer hardware protocol. The network interface 110 may connect to one or more physical layers, wired or unwired or both. From there the Network Speaker Controller 120 provides the intelligence to run the various application features of the network speaker, including the higher levels of the TCP/IP protocol. Audio sources (Digital Music content) received from the network and addressed to a particular network speaker 100A are sent to the audio format converter 121 that converts the source digital audio format into a form ready to be converted to analog. The correctly re-formatted digital signal is sent to the digital to DAC 122 to be converted from digital to analog. The analog signal then goes to a pre-amp 123 where the signal is adjusted and filtered. Included in the pre-amp 123 can be an active crossover which operates at preamp level to limit the frequencies to the amplifier or amplifiers connected to it. The speaker components connected to these pre-amplifiers would therefore receive a limited frequency range, and can be optimized for the frequencies received. The pre-amp signal then goes to the amplifier section 125, and the amplified signal proceeds to the speaker/microphone driver 126 and out the speaker/microphone components 127 to become audio sound waves. Because the application software in the Network Speaker controller 120 and audio format converter 121 can be updated over the network and with the use of sufficient processing power, and presence of ample memory, the network speaker 100A can be made to play currently unknown digital formats in the future. The audio format converter 121 may have the DAC 122 built in. The speaker sensors 124 which may include temperature, SPL (such as a baffle microphone), ambient and noise floor, pressure, and voltage sensors provide the on board application speaker feedback which enables internal auto adjustment to enhance speaker protection and performance and allow for sending control signals back to other devices which may need/want the status information. A very useful application for this would be for the use of differential masking. This is a process in which you are comparing samples from the digital source against the real time encoding samples from within the air space. The original digital source is then subtracted from the combined real time encoding and the result is a new sample.

The network interface 110 connects the network speaker 100A to the actual network backbone 200 and will vary depending on the physical media and physical layer protocol used. Network interface cards, commonly referred to as NICs, are often used to connect PCs to a wired network, and are used in the preferred embodiment when the network backbone is some form of wired cable or fiber optics. The NIC provides a physical connection between the networking cable and the computer's internal bus. Different computers have different bus architectures; the most common are PCO found on 486/Pentium PCs and ISA expansion slots commonly found on 386 and older PCs. NICs come in three basic varieties: 8-bit, 16-bit, and 32-bit. The larger the number of bits that can be transferred to the NIC, the faster the NIC can transfer data to the network cable. Many NIC adapters comply with Plug-n-Play specifications. On these systems, NICs are automatically configured without user intervention, while on non-Plug-n-Play systems, configuration is done manually through a setup program and/or DIP switches. Cards are available to support almost all networking standards, including the latest Fast Ethernet environment. Fast Ethernet NICs are often 10/100 capable, and will automatically set to the appropriate speed. Full duplex networking is another option, where a dedicated connection to a switch allows a NIC to operate at twice the speed. NIC cards with multiple terminations capable of supporting multiple physical layer protocols or within protocol types are to be preferred. Within the NIC cards are transceivers used to connect nodes to the various Ethernet media. Most computers and network interface cards contain a built-in 10BASE-T or 10BASE2 transceiver, allowing them to be connected directly to Ethernet without requiring an external transceiver. Many Ethernet devices provide an AUI connector to allow the user to connect to any media type via an external transceiver. The AUI connector consists of a 15-pin D-shell type connector, female on the computer side, male on the transceiver side Thickwire (10BASE5) cables also use transceivers to allow connections. For Fast Ethernet networks, a new interface called the MIII (Media Independent Interface) was developed to offer a flexible way to support 100 Mbps connections. The MII is a popular way to connect 100BASE-FX links to copper-based Fast Ethernet devices. Wireless backbone physical layer network connections are made using RF network receivers made by companies such as Linksys, Cisco, IBM, DLINK and others, using wireless protocols such as 802.11x, UWB (ultra wideband), Bluetooth, and more as the network interface 101.

The network speaker controller 120 is an embedded controller with flash memory programmed to function as a web server. The network speaker controller 120 and the audio format converter 121 are enabled to allow their application programming to be updated over the network, the network speaker can be made to play currently unknown digital formats in the future. The audio sources received from the network most likely will be in an encoded and/or compressed format. Digital audio coding or digital audio compression is the art of minimizing storage space (or channel bandwidth) requirements for audio data. Modern perceptual audio coding protocols, synonymously called digital audio compression techniques, like MPEG Layer-III or MPEG-2 AAC, ATRACK3, WMA, Ogg Vorbis, or "Corona", and even a packet switched Dolby Digital (AC3 over Ipv6), exploit the properties of the human ear (the perception of sound) to achieve a respectable size reduction with little or no perceptible loss of quality. This compression is usually more than just reducing the sampling rate and the resolution of your samples. Basically; this is realized by perceptual coding techniques addressing the perception of sound waves by the human ear, which remove the redundant and irrelevant parts of the sound signal. The sensitivity of the human auditory systems for audio signals varies in the frequency domain being high for frequencies between 2.5 and 5 kHz and decreasing beyond and below that frequency band. The sensitivity is represented by the Threshold In Quiet so that any tone below the threshold will not be perceived. The most important psychoacoustics fact is the masking effect of spectral sound elements in an audio signal like tones and noise. For every tone in the audio signal a masking threshold can be calculated. If another tone lies below this masking threshold, it will be masked by the louder tone and remains inaudible, too. These inaudible elements of an audio signal are irrelevant for the human perception and thus can be eliminated by the encoder. The result after encoding and decoding is different from the original, but it will sound more or less the same to the human ear. How closely it would sound to the original depends on how much compression had been performed on it.

Audio compression really consists of two parts. The first part, called encoding, transforms the digital audio data that resides, say, in a WAVE file, into a highly compressed form called bitstream (or coded audio data). To play the bitstream on your soundcard, you need the second part, called decoding. Decoding takes the bitstream and reconstructs it to a WAVE file. Highest coding efficiency is achieved with algorithms exploiting signal redundancies and irrelevancies in the frequency domain based on a model of the human auditory system. Current coders use the same basic structure. The coding scheme can be described as "perceptual noise shaping" or "perceptual sub-band/transform coding". The encoder analyzes the spectral components of the audio signal by calculating a filterbank (transform) and applies a psychoacoustics model to estimate the just noticeable noise-level. In its quantization and coding stage, the encoder tries to allocate the available number of data bits in a way to meet both the bit rate and masking requirements. The decoder is much less complex. Its only task is to synthesize an audio signal out of the coded spectral components.

The term psychoacoustics describes the characteristics of the human auditory system on which modern audio coding technology is based providing audio quality of a coded and decoded audio signal the quality of the psychoacoustics model used by an audio encoder is of prime importance. Audio data decompression and de-coding of audio formats into the audio format acceptable the loudspeaker is performed by the audio format converter 121. This audio format conversion of different formats allows high quality low bit-rate applications, like soundtracks for CD-ROM game, solid-state sound memories, Internet audio, or digital audio broadcasting systems to all be played over the same speaker. The audio format converter 121 function in the current embodiment of the networked speaker will be performed by an audio coding and decoding chip set (CODEC). CODEC hardware and or software is currently available from such companies as Micronas, Sigmatel, TI, Cirrus, Motorola, Fraunhofer, and Microsoft. CODECS handle the many current encoding protocols such as WMA, MPEG-2 AAC, MP3 (MPEG Layer III), MPSPro, G2, ATRACK3, MP3PRO, "Corona", (WMAPro) Ogg-Vorbis and others. To best perform the audio format conversion function, the CODEC should be designed to handle all types of audio content, from speech-only audio recorded with a low sampling rate to high-quality stereo music. The CODEC should be very resistant to degradation due to packet loss, and have an efficient encoding algorithms to perform fast encodes and decodes, and to minimize the size of the compressed audio files, and still produce quality sound when they are decoded. In addition, the CODEC should be highly scalable and provide high-quality mono or stereo audio content over a wide range of bandwidths, to allow selection of the best combination of bandwidth and sampling rate for the particular content being played or recorded. Content encoded at 192 Kbps by the CODEC should be virtually indistinguishable to a human ear from content originating on a compact disc. This extremely high-quality content is called CD transparency. A preferred embodiment of this invention uses the Windows Media Audio (WMA) Audio CODEC by Microsoft. The audio format converter 121 function could also be performed by a decoder chip with no encoder functionality if no digital audio reformatting or digital encoding of analog audio is desired.

The digital to analog converter 122, converts a digital input into an analog level output. At the pre-amp 123, the analog signal is adjusted and filtered, and any desired active or electronic crossover may be performed. An electric crossover is a powered electronic circuit which limits or divides frequencies. Most electronic crossovers have output controls for each individual channel. This allows you to set the gains for all amplifiers at one convenient location, as well as the ability to level match a system. Some crossovers will allow you to set the low and high pass filters separately, which allows you to tune out acoustic peaks or valleys at or near the crossover frequencies. One of the advantages of electronic crossovers is that there is little or no insertion loss. Passive crossovers reduce the amplifier power slightly, due to their resistance. Another advantage of electronic crossovers is the ability to separate low frequencies into their own exclusive amplifier, which reduces distortion heard at high volumes in the high frequency speakers. Amplification of low frequencies requires greater power than higher frequencies. When an amplifier is at or near peak output, clipping may occur, which is able to destroy tweeters and other speakers with small voice coils. A separate low frequency amplifier allows the total system to play louder and with lower distortion. An adjustable crossover allows the user to make crossover changes easily and to immediately hear the effect of the changes. Changing the filters, or crossover points, lets users adjust the audio to meet their preferences. The electronic crossover, by limiting the frequencies to the amplifier or amplifiers connected to it, also ensures that the speakers which are connected to these amplifier(s) would therefore receive a limited frequency range, and these speakers can be optimized for the frequencies received. It also enables personal preferences in frequency range pre-amplification adjustment. The advantages of using active filters are that they are built onto the pre-amp circuit board. Changing the filters (or crossover points) is usually accomplished through external dial turning, by changing frequency modules with a switch or by changing crossovers if fixed types are used. An adjustable crossover is preferred.

The amplifier 125 is comprised of one or more amplifier circuits that amplify the audio signal to the desired final signal strength. Using multiple amplifiers takes advantage of the crossover frequency filtering to optimize the amplifier for the frequency range received. Amplifiers using the latest in digital amplifier technology that can efficiently produce large amounts of power with a much smaller heat sink than in past designs are preferable, and this also will eliminate the need for another DAC. The speaker/microphone driver 126 is comprised of one or more speaker drivers circuits. Using multiple drivers for multiple speakers allows the speakers to be optimized for the frequency range received. The speaker/microphone components 127 convert the signal to sound and are voiced and designed to handle a wide dynamic range of audio frequencies and are able to aid in the accurate reproduction of sound from a digital source.

Figure 3:
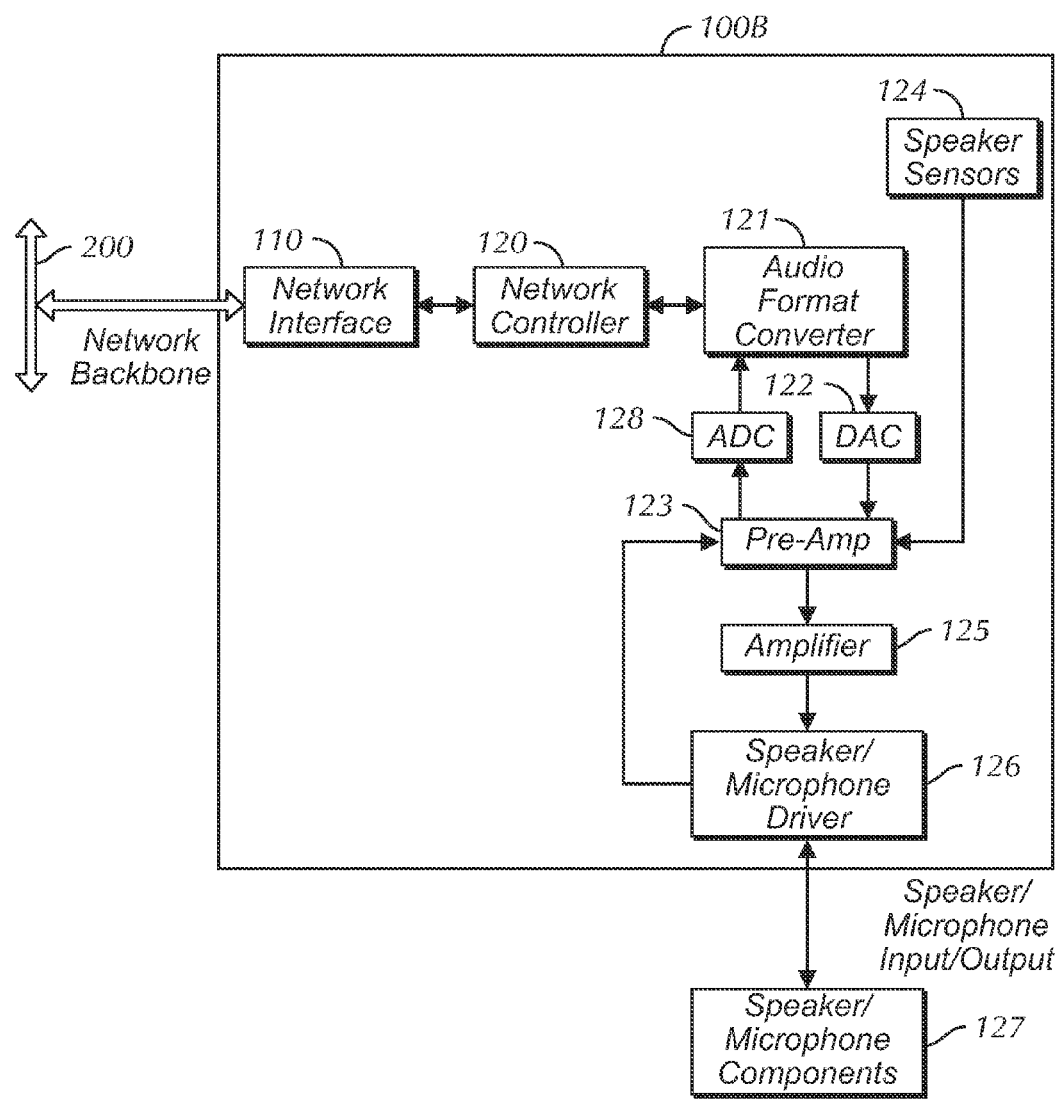
FIG. 3 is a block diagram of another network speaker embodiment.

FIG. 3 shows another network speaker embodiment 100B. The speaker embodiment 100B includes all of the components of the speaker embodiment 100A and identical components bear the same reference numerals. In addition, speaker embodiment includes an analog to digital converter (ADC) 128 and a modified speaker/microphone driver 126*b*. The speaker/microphone driver 126*b* circuitry is expanded to serve as both an output driver and a microphone input for half duplex operation (one way conversations), and an internal microphone can implement a full duplex operation (simultaneous two way conversations). The microphone input is sent to the pre-amp 123 for signal adjustment and filtering. From there it is sent to the analog to digital converter 128 to convert the analog signal to a simple digital format. The audio format converter 121 then takes the digital microphone input and compresses and encodes it into a desired format for distribution. The encoded format of which may vary, depending on the application is sent to the network controller 120 where, depending on the software application and programming, its final destination and function are determined. The input may be stored locally for future audio feedback, used locally, or it may be sent out to the network through the network interface 110. The input could be used with a voice recognition application to initiate spoken audio or home control commands. Speaker sensors 124 feedback received by the pre-amp 123 can also be sent to the ADC 128 to be converted from analog to digital format, and then passed on to the network controller 120. Depending on the network controller 120 applications, the feedback can then be sent out to network interface 110 onto the network backbone 200 as an alarm or other condition if desired. Additional features in the audio format converter 121 in conjunction with application software could enable the ability to change audio setting(s) based on the type of music that is being played, or even the user playing it, or Time of Day (TOD). The network speaker 100B may have the ability, through the audio format converter 121 or other circuitry, to support headphones.

Figure 4:
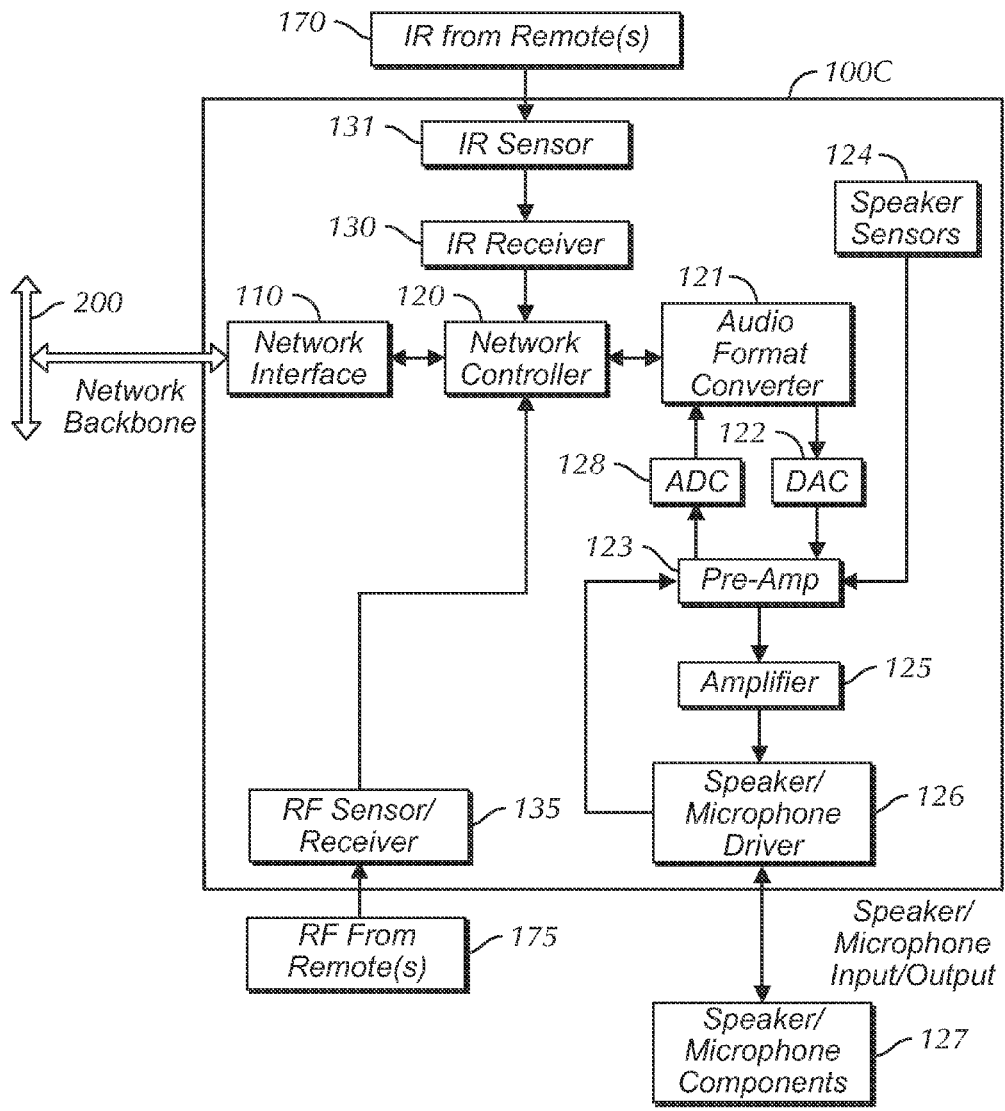
FIG. 4 is a block diagram of another network speaker embodiment.

FIG. 4 depicts another network speaker embodiment 100C with wireless remote control access. All components of speaker embodiment 100B are present in speaker embodiment 100C and bear the same reference numerals. In addition, additional components provide wireless remote control from IR and RF remotes. It should be noted that the additional components could have been added to the network speaker embodiment 100A as well. An internal IR sensor 131 senses IR from one or more external IR remotes 170. The sensed IR is sent to an IR receiver 130 that processed the IR input, and the processed IR input is sent to the network controller 120 which then performs commands as per its application software. If desired, the IR sensor 131 may be external of the speaker 100C which then can be installed behind a wall as wall speakers, and still receive IR. The network controller 120 can send the processed IR commands out the network interface 110 onto the network to be processed remotely by the Legacy Converter/Controller 600 which then translates them into commands to the legacy sources 500. Alternatively, the network controller 120 can send the processed IR commands out the network interface 110 onto the network to be processed remotely by the legacy Converter/Controller 60 which then translates them into Legacy home control network 700 commands. In the same manner, RF control access is provided by a RF Sensor/Transceiver 135 which receives input from RF remotes 175 and other network speaker transceivers, and transmits information to the network controller 120. While this embodiment 100C shows both IR and RF access through the same network speaker, it will be appreciated that IR only control access or RF only control access could be implemented.

The wireless control access allow IR or RF input to the speakers 100C to be used to remotely control the system 20 including control of the audio, (including multi destination sync), video, HVAC, security, room light level house scenes, etc., if the system is so programmed. Where the software application includes the ability to "learn" new IR commands and associate them with audio or house control commands, existing legacy sources with IR remotes can be integrated into the network controller through the legacy Converter/Controller 600. And because the legacy Converter/Controller 600 is upgradeable over the network, the network speaker IR input ability could be made to control currently unknown system devices in the future.

Figure 5:
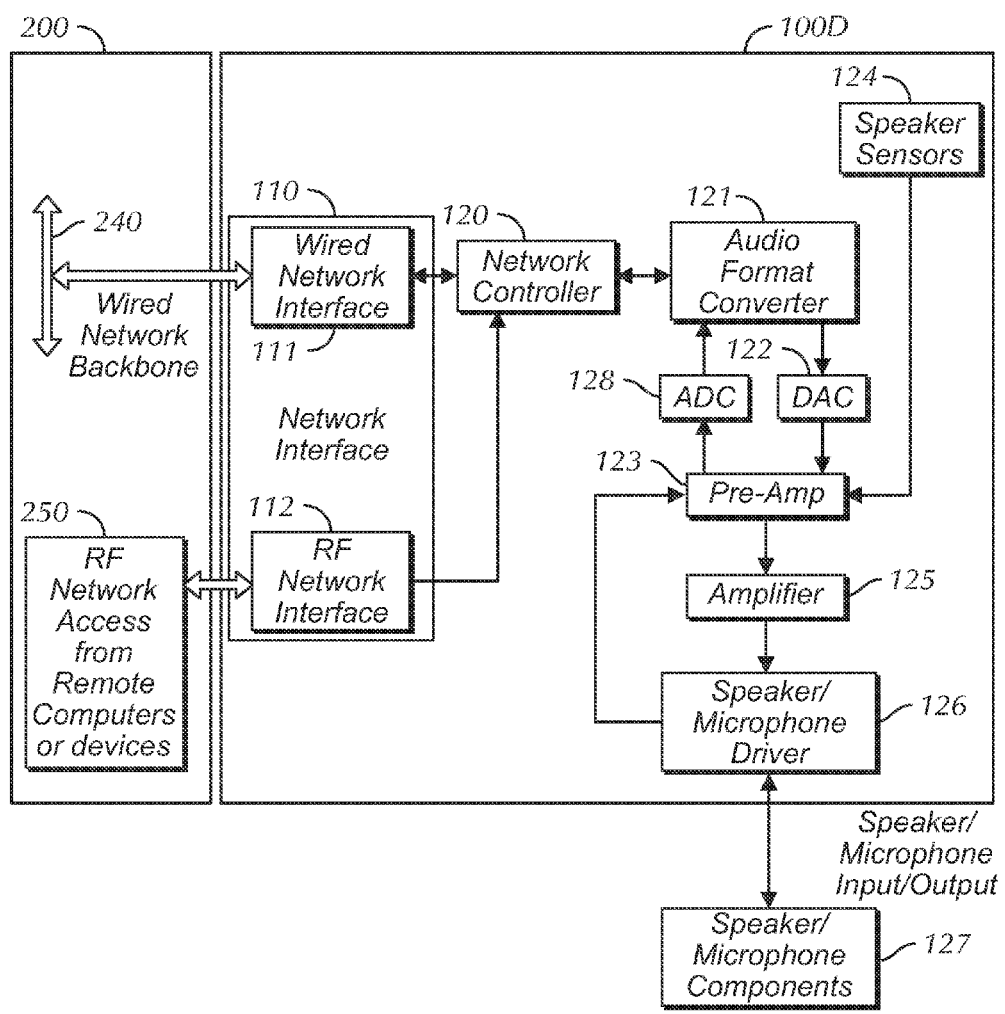
FIG. 5 is a block diagram of another network speaker embodiment.

FIG. 5 shows another network speaker embodiment 100D that serves as bridge between one or more wireless network devices and a wired segment of the network 200, known as a wireless access point. This wireless access point embodiment includes the components of embodiment 100B with additional components added for wireless-wired bridging, such as dual mode ad-hoc to infrastructure mode. The network 200 consists of at least one physically wired network section 240 and at least wireless network segment 250. The network interface 110 consists of two parts, a wired network interface 111 connecting the network speaker 100D to the wired network backbone 240 and an RF network interface 112 connecting the network speaker 100D to the wireless RF network backbone 250. Network communication can pass between the wired backbone 240 and the wireless RF network backbone 250 via the network speaker 100D. The RF network interface 112 consists of an RF receiver/transmitter capable of both receiving and sending RF network communication.

Figure 6:
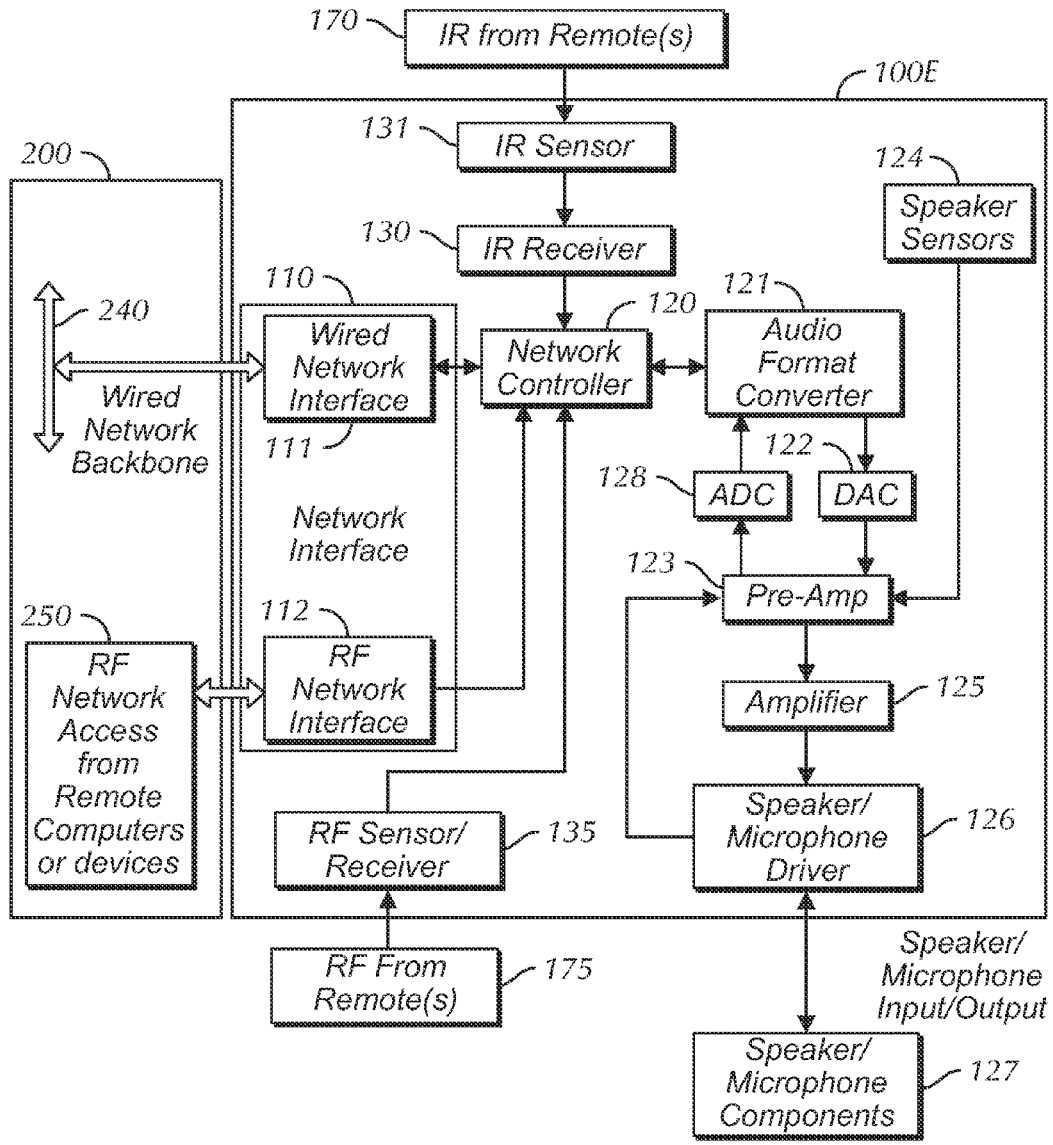
FIG. 6 is a block diagram of another network speaker embodiment.

FIG. 6 illustrates another speaker embodiment 100E that has wireless control access and that serves as a wireless access point. This wireless access point embodiment includes all of the components of embodiments of 100B, 100C and 100D.

If a home has a network speaker type system, the application software opens all kinds of possibilities. New sources or new source content may enable these intelligent speakers 100 to have more features and playback formats that are not in existence today, and to adjust to the source content. An example of this would be the ability to change audio settings based on the type of music that is being played, or even the user playing it, or Time of Day (TOC). This will be highly customizable long past the time of installation, to keep the audio system upgradeable without structural changes to the home even if the network speakers are embedded in walls and other not easily accessed locations. In addition, a network speaker 100 with a microphone and the appropriate application software could record and route messages digitally to any house network node or internet node; locate and identify a user in a room, which in turn enables the system 20 to route voice mail and message to the room the user is presently in on demand; locate and identify a room user, which in turn enables the system to route voice mail and message to the room the user is presently in on demand; serve as a voice recognition and authorization point to enable direct voice control of any node on the network or any legacy audio source 500 or legacy control network 700 device that may be connected to the network 200 through a legacy converter/controller 600; or to automatically record and/or route voice messages from one user to the room in which the recipient identified in the voice message is currently located. Multiple network speakers 100 with microphones in one room could even triangulate the location of the user, which in turn enables the system to optimize the audio for the users current location.

The network speaker 100 with a sufficient memory and the appropriate application software could store voice mail to be played on demand by the room user or in a totally wireless network 200 serve as a wireless repeater within a home if the wireless communication medium signal strength was insufficient to reach all rooms or areas of the home from all locations. Also, a strategically placed network speaker 100 serving as a wireless access point allows the communication of audio, data, commands or any other communications from mobile network nodes whenever they are within communication range, such as PDAs, mobile controllers, mobile computers, wireless headphones, or network speakers 100 in mobile units such as automobiles.

A network speaker 100 with IR or RF receivers and the appropriate application software would allow wireless remote control, status and feedback from any IR or RF remote, or other network speaker transceiver, to any node on the network or any legacy audio source 500 or legacy control network 700 device that may be connected to the network 200 through a legacy converter/controller 600. A network speaker 100 with a RF receiver capable of transmitting RF could enable wireless non-networked headphones. Also, a network speaker 100 could encode and send and transmit sound and images from a room out on the network, as well as act as the source point for room control and automation and voice recognition services for control and automation. In addition, a network speaker 100 could participate in a multi speaker session during which each network speaker 100 could perform as a master or slave mode. A network speaker 100 in the master mode would control and distribute multi session clocks and this is where they would originate and be calculated. The network speaker 100 in the slave mode would receive via TCP/IP and/or RF clocking information from the master in a multi session mode.

A network speaker 100 additionally could be an audio source locally within the room via internal solid-state memory as well as terrestrial analog reception (AM/FM/CATV) if components were added to receive and play back digital and analog terrestrial radio frequencies (AM/FM/CATV).

Figure 7:
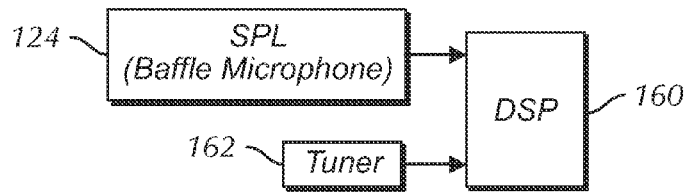
FIG. 7 is a block diagram of the internal components of a network speaker embodiment.

FIG. 7 is a block diagram that shows a baffle microphone 124 and a tuner 162 coupled to a DSP (digital signal processor) 160. This figure illustrates that DSP 160 (also described as a signal processor means elsewhere in the original disclosure) is an alternative embodiment to the use of one or more of the following components that include a separate Audio Format Converter 121, an ADC 128, a DAC 122, a Pre-Amp 123, and an Amplifier 125 as illustrated in FIGS. 1-6 and 8-10. The DSP 160 may include a real time adaptive analyzer to process information. DSP 160 may also include a speaker controller for providing intelligence to operate application protocol.

Figure 8:
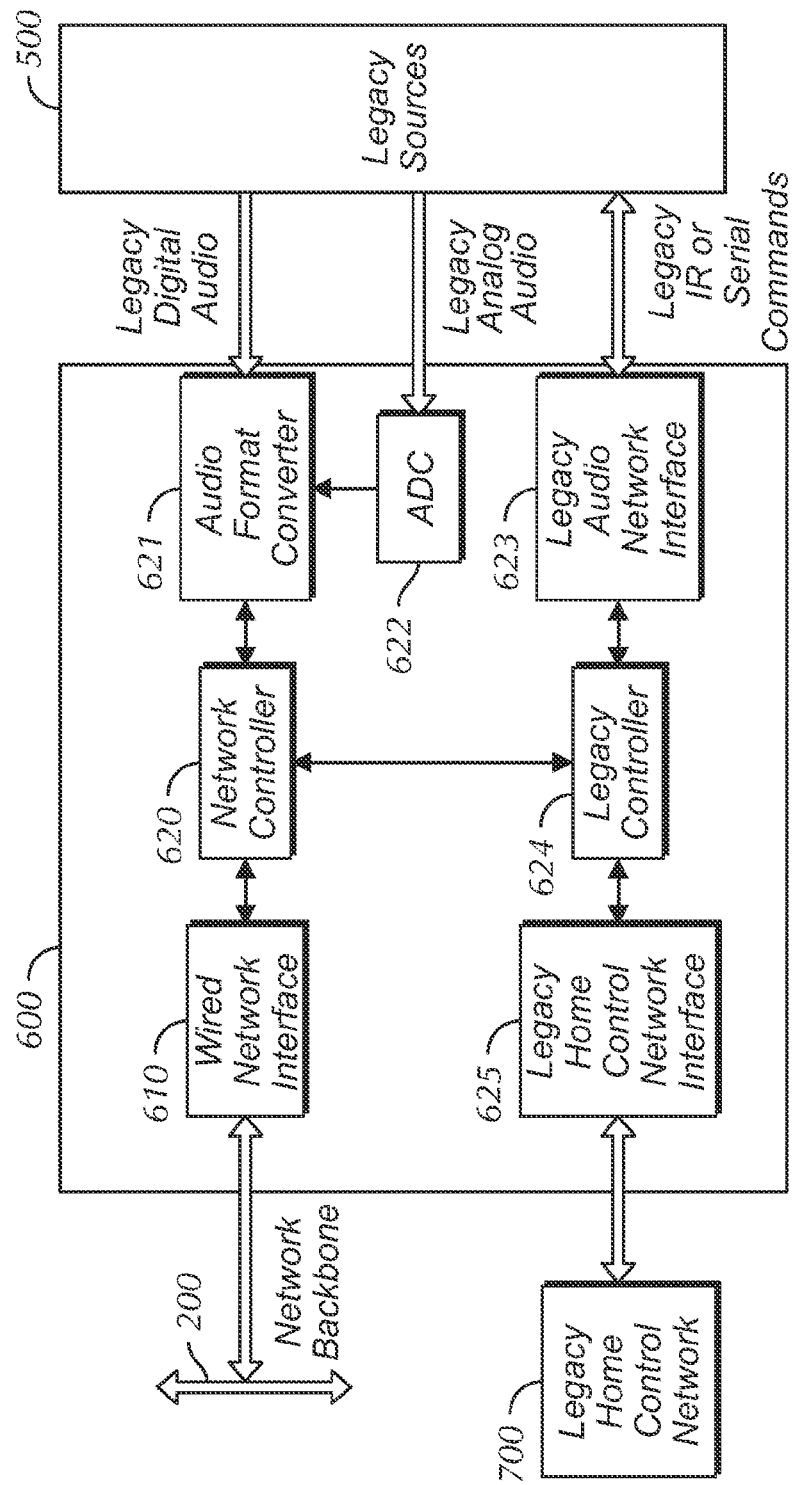
FIG. 8 is a block diagram of a Legacy Audio Converter/Controller for use in the system shown in FIG. 1.

FIG. 8 depicts a legacy Audio Converter/Controller 600 embodiment, which includes many similar components as the Network Speaker 100. The legacy Audio Converter/Controller 600 communicates with the network backbone (Ethernet) 200 through a network interface 610 which handles the physical layer hardware protocol and may connect to one or more physical layers, wired or unwired or both. Coupled to the network interface 610 is a Network Controller 620 which provides the intelligence to run various application features of the legacy Audio Converter/Controller 600, including the higher levels of the TCP/IP protocol. The Network Controller 620 controls an audio format converter 621 which converts the legacy source audio into the desired network digital format for distribution. Digital audio from legacy sources 500 are transmitted directly to the audio format converter 621 to be re-formatted into the desired digital format. Analog audio from legacy sources 500 are fed to an analog to digital converter ("ADC") 622, and the resultant digitized signal then goes to the audio format converter 621 to be coded into the desired digital format. The Network Controller 620 takes the properly formatted digital audio and sends it to the network 200 via the network interface 610. Also, the audio format converter 621 may consist of multiple encoders to provide multiple conversions of different legacy audio inputs simultaneously. The Legacy Converter/Controller 600 uses the analog video from the legacy source device for encoding to a packet switched digital format such as WMAPro "Corona", and also uses the analog video inputs for power status and feedback.

The network interface 610 may vary depending on the physical medium and physical layer protocol used. Network interface cards, commonly referred to as NICs, are often used to connect a PC to a wired network, and are used in the preferred embodiment when the network backbone is some form of wired cable or fiber optics. Such a NIC provides a physical connection between the networking cable and the computer's internal bus. Different computers have different bus architectures; the most common are PCI found on 486/Pentium PCs and ISA expansion slots commonly found on 386 and older PCs. Typically NICs come in three basic varieties: 8-bit, 16-bit, and 32-bit. The larger the number of bits that can be transferred to the NIC, the faster the NIC can transfer data to the network cable. Many NIC adapters comply with Plug-n-Play specifications. On these systems, NICs are automatically configured without user intervention, while on non-Plug-n-Play systems, configuration is done manually through a setup program and/or DIP switches. Cards are available to support almost all networking standards, including the latest Fast Ethernet environment. Fast Ethernet NICs are often 10/100 capable, and will automatically set to the appropriate speed. Full duplex networking is another option, where a dedicated connection to a switch allows a NIC to operate at twice the speed. NIC cards with multiple terminations capable of supporting multiple physical layer protocols or within protocol types are preferred so that the NIC cards include transceivers used to connect nodes to the various Ethernet media. Most computers and network interface cards contain a built-in 10BASE-T or 10BASE2 transceiver, allowing them to be connected directly to Ethernet without requiring an external transceiver. Many Ethernet devices provide an AUI connector to allow the user to connect to any media type via an external transceiver. The AUI connector consists of a 15-pin D-shell type connector, female on the computer side, male on the transceiver side. Thickwire (10BASE5) cables also use transceivers to allow connections. For Fast Ethernet networks, a new interface called the MII (Media Independent Interface) was developed to offer a flexible way to support 100 Mbps connections. The MII is a popular way to connect 100BASE-FX links to copper-based Fast Ethernet devices. Wireless backbone physical layer network connections are made using RF network receivers made by companies such as Linksys, Cisco, IBM, DLINK, and others, using wireless protocols such as 802.11x, UWB, Bluetooth, and more as the network interface 610.

The network speaker controller 620 is an embedded controller with flash memory programmed to function as a web server and enabled with the audio format converter 621 to allow their application programming to be updated over the network, the legacy Audio Converter/Controller 600 can be made to code audio to currently unknown digital formats in the future. As in the speaker embodiments described above, the desired audio to be distributed will likely be in a coded and/or compressed format. Digital audio coding or digital audio compression is the art of minimizing storage space (or channel bandwidth) requirements for audio data. Modern perceptual audio coding protocols, synonymously called digital audio compression techniques, like MPEG Layer-III or MPEG-2 AAC, ATRACK3, G2, WMA, Ogg Vorbis, or WMAPro, "Corona", exploit the properties of the human ear (the perception of sound) to achieve a respectable size reduction with little or no perceptible loss of quality. As described above, this compression, in addition to reducing the sampling rate and the resolution of the audio samples employees perceptual coding techniques addressing the perception of sound waves by the human ear, that remove the redundant and irrelevant parts of the sound signal. The sensitivity of the human auditory systems for audio signals varies in the frequency domain being high for frequencies between 2.5 and 5 kHz and decreasing beyond and below this frequency band. The sensitivity is represented by the Threshold In Quiet Any tone below this threshold will not be perceived. The most important psychoacoustics fact is the masking effect of spectral sound elements in an audio signal like tones and noise. For every tone in the audio signal a masking threshold can be calculated. If another tone lies below this masking threshold, it will be masked by the louder tone and remains inaudible too. These inaudible elements of an audio signal are irrelevant for the human perception and thus can be eliminated by the coder. The sound resulting after coding and decoding is different, but will be perceived more or less the same by the human ear. How closely it would sound to the original depends on how much compression had been performed.

Audio compression actually consists of two parts. The first part, called coding or encoding, transforms the digital audio data that resides, say, in a WAVE file, into a highly compressed form called bitstream (or coded audio data). To play the bitstream on your soundcard, you need the second part, called decoding. Decoding takes the bitstream and reconstructs it to a WAVE file. Highest coding efficiency is achieved with algorithms exploiting signal redundancies and irrelevancies in the frequency domain based on a model of the human auditory system. Current coders use the same basic structure to produce coding that can be described as "perceptual noise shaping" or "perceptual sub-band/transform coding". The encoder analyzes the spectral components of the audio signal by calculating a filterbank (transform) and applies a psychoacoustics model to estimate the just noticeable noise-level. In its quantization and coding stage, the encoder tries to allocate the available number of data bits in a way to meet both the bit rate and masking requirements. The decoder is much less complex. Its only task is to synthesize an audio signal out of the coded spectral components. Psychoacoustics describes the characteristics of the human auditory system on which modern audio coding technology is based. For the audio quality of a coded and decoded audio signal the quality of the psychoacoustics model used by an audio encoder is of prime importance.

The audio format converter 621 performs audio data compression and encoding of audio formats into the audio format acceptable for distribution to the end receiver on the network and can consist of an audio encoder-decoder chip (CODEC). To best perform the audio format conversion function, the CODEC should be designed to handle all types of audio content, from speech-only audio recorded with a low sampling rate to high-quality stereo music. The CODEC should be very resistant to degradation due to packet loss, and have efficient encoding algorithms to perform fast encodes and decodes, and to minimize the size of the compressed audio files, and still produce quality sound when they are decoded. Also, the CODEC should be highly scalable and provide high-quality mono or stereo audio content over a wide range of bandwidths, to allow selection of the best combination of bandwidth and sampling rate for the particular content being played or recorded. Content encoded at 192 Kbps by the CODEC should be virtually indistinguishable to a human ear from content originating on a compact disc. This extremely high-quality content is called CD transparency.

The analog to digital converter 622, commonly referred to as an ADC, converts an analog level input to a digital output. Adding a microphone speaker input to the ADC will enable voice control of the legacy Audio Converter/Controller 600. It would also enable the legacy Audio Converter/Controller 600 to record audio input for later use as system messages or audio feedback. Depending on the software application and programming in the network controller 620, the audio input may be stored locally for future audio feedback, used locally, or it may be fed out to the network through the network interface 610. The audio input could be used with a voice recognition application to initiate spoken audio or home control commands.

The Legacy Audio Converter/Controller 600 may also communicate with the legacy sources 500 using a legacy communication method, such as IR or serial commands, that are understood by the legacy device. The planned embodiment of the invention will use the fixed set of serial commands already understood by the target legacy source. The network controller 620 controls and communicates with a legacy controller 624, which also communicates with the legacy source 500 through a legacy audio network interface 623. In a preferred embodiment of the invention, a RS-232 serial command interface will be used. The functions of the network controller 620 and the legacy controller can be combined into one embedded controller.

The Legacy Audio converter/Controller 600 may also communicate with the legacy home control network 700 using the network communication method understood and practiced by the legacy home control network 700 and such communication may vary greatly depending on the legacy home control network 700 being used. A preferred embodiment of the invention will use the CEBus powerline protocol for its communication method. The legacy controller 624 controls and communicates via a legacy home control network interface 625, with a legacy home control network 700. The functions of the legacy controller in controlling the legacy sources 500 and the legacy home control network 700 and the legacy controller could be separated out into two separate embedded controllers, or combined with the network controller 620. If no legacy source 500 is available, the legacy audio network interface 623 and the legacy source control function of the legacy controller 624 may be eliminated. Similarly, in the absence of a legacy home control network 700, the legacy home control network interface 625 and the legacy home network control function of the legacy controller 624 may be eliminated.

Figure 9:
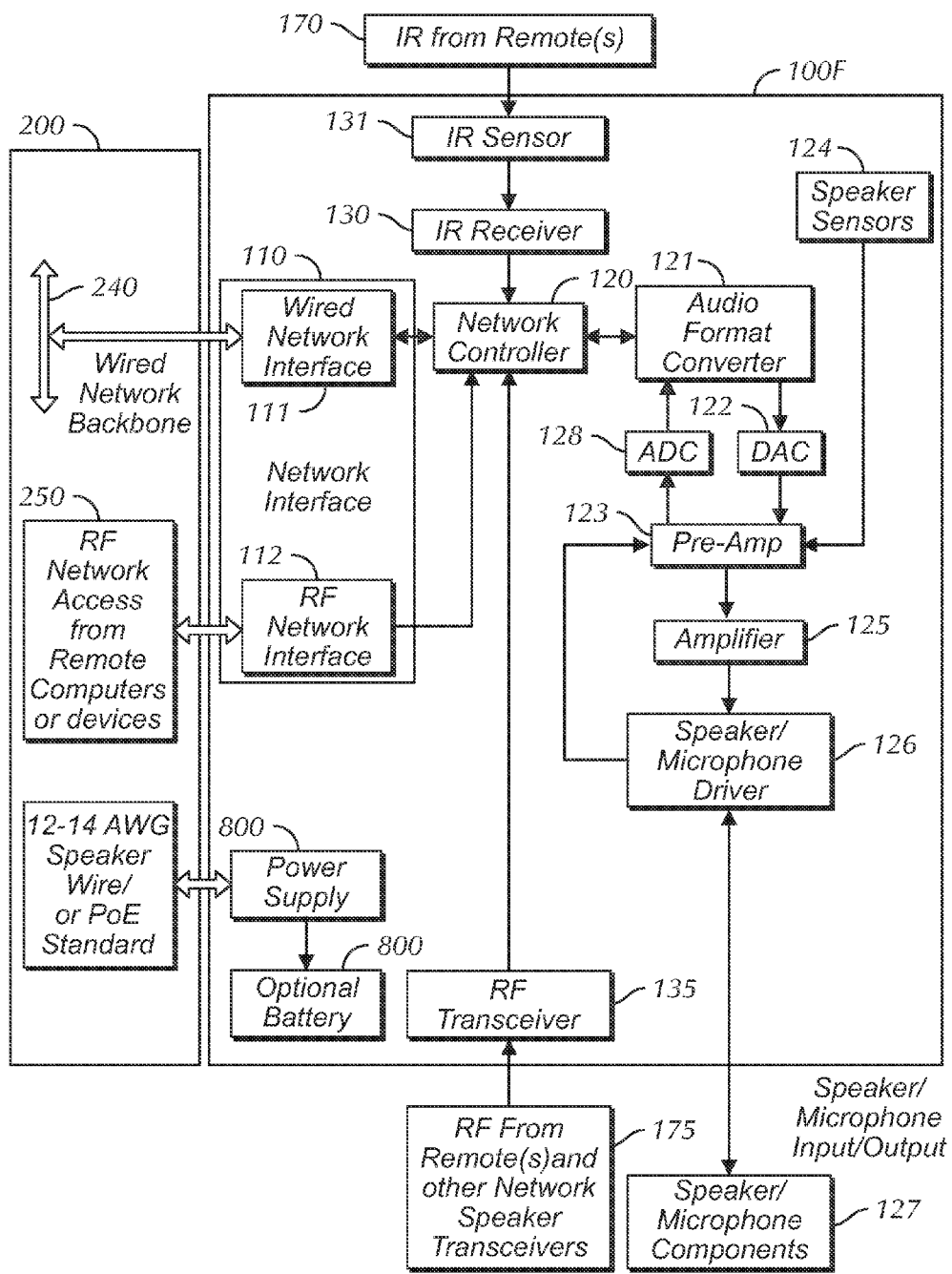
FIG. 9 is a block diagram of a network speaker including power options.

As illustrated in FIG. 9 network speaker 100F can receive DC current from external regulated power supplies over existing 14-18 AWG speaker wire or can employ PoE (Power over Ethernet) technology to trickle charge the battery. Also, charge status can be provided for the battery 800.

Network speaker 100F has power applied as DC current from a rechargeable battery source 800 either located within the speaker or inserted into the speaker as a removable battery pack. This would also allow for line power status, which would perform a function specific to the application once this condition occurs.

Figure 10:
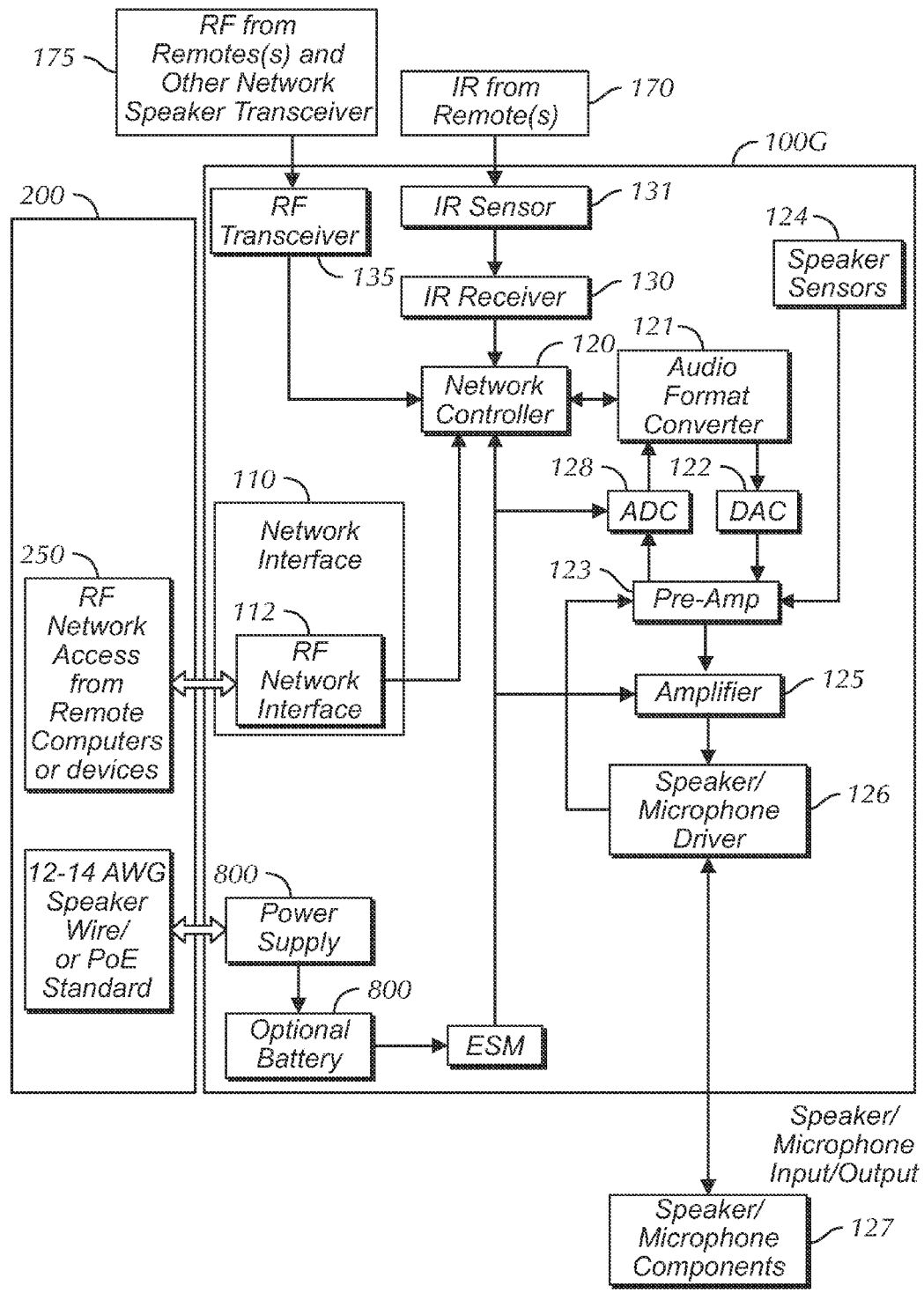
FIG. 10 is a network speaker including battery powered options and an energy storage module.

FIG. 10 depicts another speaker embodiment 100G which also can be battery powered. In addition, the speaker 100G includes an ESM (Energy Storage Module) which improves audio performance.

Obviously, many modifications and variations of the present invention are possible in light of the above teachings. It is to be understood, therefore, that the invention can be practiced otherwise than as specifically described.

To summarize, this disclosure describes an intelligent network communication device in an audio video distribution system that uses a local area network. The intelligent network communication device includes a network speaker node; an audio input device that receives the analog audio signal and that couples to a network speaker node through a speaker/microphone driver; and an audio output device that transmits the analog audio signal and that couples to the network speaker node through the speaker/microphone driver. The network speaker node further includes a controller with a network interface that couples to the local area network and controls the processing of the digital audio signal, where the controller further comprises an embedded controller with memory and which is programmed to function as a web server. The network speaker node further includes a digital signal processor that couples to the controller, where the digital signal processor processes and formats the digital audio signal and the analog audio signal and converts the digital audio signal to and from the analog audio signal. And, the network speaker node further includes a speaker/microphone driver that couples to the digital signal processor and provides the external connection for the analog audio signal.

The intelligent network communication device further provides that the audio input device is a microphone. In addition, the intelligent network communication device further provides that the audio output device may include headphones or include one or more speakers.

Additionally, the intelligent network communication device further includes speaker sensors that couple to the digital signal processor and provide feedback and allow for sending control signals back to other devices in the local area network.

Other embodiments of the invention will be apparent to those skilled in the art after considering this specification or practicing the disclosed invention. The specification and examples above are exemplary only, with the true scope of the invention being indicated by the following claims.

We claim the following invention:

1. An intelligent network communication device in an audio video distribution system that uses a TCP/IP local area network, comprising:
   a network speaker node that further comprises:
   an embedded controller with memory and which is programmed to function as a web server;
   a pre-amplifier that couples to a digital signal processor and adjusts and filters an analog audio signal and an amplifier that couples to said pre-amplifier and amplifies said analog audio signal, said pre-amplifier further comprises an electronic crossover for frequency division;
   said digital signal processor that couples to said embedded controller, said digital signal processor processes and formats a digital audio signal and said analog audio signal and converts said digital audio signal to and from said analog audio signal;
   speaker sensors that include a microphone used for receiving and or gathering control information that enables internal auto adjustment by frequency separation to enhance speaker protection and performance from said network speaker node's surroundings and optimizes the audio for said network speaker node's current location, said control information is sent to other network speaker nodes on the TCP/IP local area network; and
   a speaker/microphone driver that couples to said amplifier and provides the external connection to speaker/microphone components for said analog audio signal;

an audio input device that receives said analog audio signal and that couples to said network speaker node through said speaker/microphone driver; and an audio output device that transmits said analog audio signal and that couples to said network speaker node through said speaker/microphone driver.

2. The claim according to claim 1 wherein said audio input device is a microphone.

3. The claim according to claim 1 wherein said audio output device are headphones.

4. The claim according to claim 1 wherein said audio output device further comprises one or more analog speakers.

5. The claim according to claim 1 wherein said speaker sensors further comprise one or more of the following: temperature sensors, SPL that further includes a baffle microphone, ambient and noise floor sensors, pressure sensors, or voltage sensors.

6. A method to manufacture an intelligent network communication device in an audio video distribution system that uses a TCP/IP local area network, comprising:

providing a network speaker node that further comprises:
an embedded controller with memory and which is programmed to function as a web server;
a pre-amplifier that couples to a digital signal processor and adjusts and filters an analog audio signal and an amplifier that couples to said pre-amplifier and amplifies said analog audio signal, said pre-amplifier further comprises an electronic crossover for frequency division;
said digital signal processor that couples to said embedded controller, said digital signal processor processes and formats a digital audio signal and said analog audio signal and converts said digital audio signal to and from the analog audio signal;
speaker sensors that include a microphone used for receiving and or gathering control information that enables internal auto adjustment by frequency separation to enhance speaker protection and performance from said network speaker node's surroundings and optimizes the audio for said network speaker node's current location, said control information is sent to other network speaker nodes on the TCP/IP local area network; and
a speaker/microphone driver that couples to said amplifier and provides the external connection to speaker/microphone components for said analog audio signal;
coupling an audio input device that receives said analog audio signal and that couples to said network speaker node through said speaker/microphone driver; and
coupling an audio output device that transmits said analog audio signal and that couples to said network speaker node through said speaker/microphone driver.

7. The claim according to claim 6 wherein said audio input device is a microphone.

8. The claim according to claim 6 wherein said audio output device are headphones.

9. The claim according to claim 6 wherein said audio output device further comprises one or more analog speakers.

10. The claim according to claim 6 wherein said speaker sensors further comprise one or more of the following: temperature sensors, SPL that further includes a baffle microphone, ambient and noise floor sensors, pressure sensors, or voltage sensors.

11. A method to use an intelligent network communication device in an audio video distribution system that uses a TCP/IP local area network, comprising:

processing the digital audio signal to and from the TCP/IP local area network with a network speaker node that further comprises:
an embedded controller with memory and which is programmed to function as a web server;
a pre-amplifier that couples to a digital signal processor and adjusts and filters an analog audio signal and an amplifier that couples to said pre-amplifier and amplifies said analog audio signal, said pre-amplifier further comprises an electronic crossover for frequency division;
said digital signal processor that couples to said embedded controller, said digital signal processor processes and formats a digital audio signal and said analog audio signal and converts said digital audio signal to and from said analog audio signal;
speaker sensors that include a microphone used for receiving and or gathering control information that enables internal auto adjustment by frequency separation to enhance speaker protection and performance from said network speaker node's surroundings and optimizes the audio for said network speaker node's current location, said control information is sent to other network speaker nodes on the TCP/IP local area network; and
a speaker/microphone driver that couples to said amplifier and provides the external connection to speaker/microphone components for said analog audio signal;
receiving said analog audio signal through an audio input device to said network speaker node through said speaker/microphone driver; and
transmitting said analog audio signal through an audio output device to said network speaker node through said speaker/microphone driver.

12. The claim according to claim 11 wherein said audio input device is a microphone.

13. The claim according to claim 11 wherein said audio output device are headphones.

14. The claim according to claim 11 wherein said audio output device further comprises one or more speakers.

15. The claim according to claim 11 wherein said speaker sensors further comprise one or more of the following: temperature sensors, SPL that further includes a baffle microphone, ambient and noise floor sensors, pressure sensors, or voltage sensors.

* * * * *

UNITED STATES PATENT AND TRADEMARK OFFICE
CERTIFICATE OF CORRECTION

PATENT NO. : 9,191,232 B2
APPLICATION NO. : 12/900666
DATED : November 17, 2015
INVENTOR(S) : Michael Braithwaite et al.

It is certified that error appears in the above-identified patent and that said Letters Patent is hereby corrected as shown below:

Specification

In column 1, line 53, delete "and or" and insert -- and/or --, therefor.

In column 8, line 43, delete "and or" and insert -- and/or --, therefor.

In column 8, line 46, delete "CODECS" and insert -- CODECs --, therefor.

In column 11, line 45, delete "in on" and insert -- on --, therefor.

In column 11, line 48, delete "in on" and insert -- on --, therefor.

Claims

In column 16, line 57, in claim 1, delete "and or" and insert -- and/or --, therefor.

In column 17, line 36, in claim 6, delete "and or" and insert -- and/or --, therefor.

In column 18, line 28, in claim 11, delete "and or" and insert -- and/or --, therefor.

Signed and Sealed this
Twenty-fourth Day of May, 2016

Michelle K. Lee
*Director of the United States Patent and Trademark Office*